(12) United States Patent
Cassany

(10) Patent No.: US 11,315,698 B2
(45) Date of Patent: Apr. 26, 2022

(54) TOOL FOR SMOOTHING IN A RADIOACTIVE ENVIRONMENT, COMPRISING A VIBRATING GRID

(71) Applicant: Areva NC, Courbevoie (FR)

(72) Inventor: Yohann Cassany, Tourlaville (FR)

(73) Assignee: Areva NC, Courbevoie (FR)

(*) Notice: Subject to any disclaimer, the term of this patent is extended or adjusted under 35 U.S.C. 154(b) by 993 days.

(21) Appl. No.: 15/579,835

(22) PCT Filed: Jun. 2, 2016

(86) PCT No.: PCT/EP2016/062464
§ 371 (c)(1),
(2) Date: Dec. 5, 2017

(87) PCT Pub. No.: WO2016/193357
PCT Pub. Date: Dec. 8, 2016

(65) Prior Publication Data
US 2018/0358141 A1 Dec. 13, 2018

(30) Foreign Application Priority Data
Jun. 5, 2015 (FR) ...................... 15 55151

(51) Int. Cl.
*G21F 9/30* (2006.01)
*C03B 5/00* (2006.01)
*C03B 5/02* (2006.01)
*C03C 1/00* (2006.01)
*B65D 88/66* (2006.01)
*C03B 5/18* (2006.01)

(52) U.S. Cl.
CPC ............ *G21F 9/305* (2013.01); *B65D 88/66* (2013.01); *C03B 5/005* (2013.01); *C03B 5/021* (2013.01); *C03B 5/18* (2013.01); *C03C 1/002* (2013.01)

(58) Field of Classification Search
CPC .. G21F 9/305; C03B 1/00; C03B 3/00; B28B 1/093; B28B 1/0935
See application file for complete search history.

(56) References Cited

U.S. PATENT DOCUMENTS 2,685,986 A * 8/1954 Hampton ............... B65D 88/66
222/200
2,857,143 A * 10/1958 Kroeckel ............... B22C 15/10
366/125

(Continued)

FOREIGN PATENT DOCUMENTS

GB  2099207 A  12/1982

OTHER PUBLICATIONS

Search Report Issued in French Patent Application No. 1555151, dated Mar. 23, 2016.
(Continued)

Primary Examiner — Jason L Lazorcik
(74) Attorney, Agent, or Firm — Pearne & Gordon LLP

(57) ABSTRACT

The invention relates to a smoothing tool (3) configured for smoothing glass frit in a radioactive environment, in an induction-melting cold crucible. Smoothing tool (3) comprising a rod (30), a grid (50) configured to be in contact with glass frit (7) to be smoothed, and at least one vibrator (37, 55, 56) configured to make the grid (50) vibrate. The grid (50) is mechanically connected to the rod (30).

25 Claims, 3 Drawing Sheets

(56) References Cited

U.S. PATENT DOCUMENTS

| | | | | |
|---|---|---|---|---|
| 3,028,183 A * | 4/1962 | Phillips | ............... | C22B 9/20 |
| | | | | 403/69 |
| 3,042,594 A * | 7/1962 | Hauth | ............... | C22B 1/02 |
| | | | | 419/23 |
| 4,297,304 A * | 10/1981 | Scheffler | ............... | G21F 9/165 |
| | | | | 264/333 |
| 4,534,893 A * | 8/1985 | Dippel | ............... | G21F 9/305 |
| | | | | 264/0.5 |
| 4,571,321 A * | 2/1986 | Kijowski | ............... | C03B 19/08 |
| | | | | 264/43 |
| 4,581,163 A * | 4/1986 | Meininger | ............... | G21F 5/005 |
| | | | | 219/72 |
| 5,134,946 A | 8/1992 | Poovey | | |
| 2005/0072717 A1* | 4/2005 | Purohit | ............... | B07B 1/46 |
| | | | | 209/309 |
| 2005/0111518 A1* | 5/2005 | Roach | ............... | F27D 27/00 |
| | | | | 373/146 |
| 2006/0050761 A1* | 3/2006 | Richardson | ............ | H05B 6/067 |
| | | | | 373/145 |
| 2006/0050762 A1* | 3/2006 | Richardson | ............... | H05B 6/24 |
| | | | | 373/150 |
| 2013/0182740 A1* | 7/2013 | Kim | ............... | F27B 14/063 |
| | | | | 373/142 |

OTHER PUBLICATIONS

Abstract, claims and Fig. 1 of NL 7 607 943 A (*Gardenbroeks* V *Navo*) Jan. 18, 1978.
International Preliminary Report on Patentability issued in Application No. PCT/EP2016/062464, dated Dec. 6, 2016.
International Search Report issued in Application No. PCT/EP2016/062464, dated Aug. 2, 2016.
Written Opinion issued in Application No. PCT/EP2016/062464, dated Aug. 2, 2016.

* cited by examiner

TOOL FOR SMOOTHING IN A RADIOACTIVE ENVIRONMENT, COMPRISING A VIBRATING GRID

TECHNICAL FIELD

The invention relates to a smoothing tool in a radioactive environment for a granular or pulverulent material, in particular glass frit.

STATE OF PRIOR ART

Glass frit is used to vitrify radioactive waste from the nuclear industry. Glass frit has a granular aspect and, when introduced in a crucible, it forms a conical pile which needs to be smoothed until it achieves a suitable flatness. It is then molten, before inserting the radioactive waste into the crucible to vitrify them.

Today, there is no smoothing tool which can be readily used in a radioactive environment. In particular, a rake-type tool is difficult to use in the presence of a hazardous radioactive level for a human operator.

DISCLOSURE OF THE INVENTION

The invention aims at solving at least partially problems encountered in known solutions, in particular to provide a means for smoothing the surface of glass frit introduced into a crucible, the feature of which is to be an induction heated cold crucible requiring the use of a metallothermy ring to trigger melting, this ring having to be positioned on the substantially planar surface of the glass frit.

To that end, one object of the invention is thus a smoothing tool configured for smoothing glass frit in a radioactive environment, comprising:
  a rod,
  a grid configured to be in contact with the grass frit to be smoothed, the grid being mechanically connected to the rod, and
  at least one vibrator configured to vibrate the grid.

The smoothing tool enables the pile formed by the glass frit to be smoothed until a suitable flatness is achieved, before heating the crucible. The smoothing tool can be relatively readily controlled at a distance from radiations, for example by a master/slave type teleoperation device.

Generally, the vibrator(s) can directly vibrate the grid, it (they) can vibrate the rod which transmits vibrations to the grid, or it (they) can vibrate both the grid and the rod.

The invention can optionally include one or more of the following characteristics combined together or not.

Advantageously, the vibrator(s) is (are) configured to pneumatically vibrate the grid, by being supplied with pressurised gas, preferably pressurised air.

According to a particular embodiment, the at least one vibrator comprises a pneumatic vibrating element attached to the grid and configured to vibrate the grid. It also comprises a pipe extending along the rod and configured to supply the pneumatic vibrating element with pressurised gas.

According to an advantageous embodiment, the grid is movably connected to the rod.

Advantageously, the grid is configured to pivot relative to the rod, preferably about an axis orthogonal to the longitudinal axis of the rod.

According to another advantageous embodiment, the grid includes recesses distributed in a regular pattern.

Preferably, the smoothing tool comprises a holding flange configured to be attached to a cover for an induction-melting crucible, preferably an induction-melting cold crucible, the rod passing through the holding flange and being, preferably at least translationally, movable relative to the holding flange.

According to another particular embodiment, the rod is configured to pivot with respect to the holding flange about a first axis of rotation, by being preferably connected at least through a ball-joint connection to the holding flange.

Preferably, the holding flange includes a clearance hole for a pressurised gas supply pipe, such as pressurised air.

The invention also relates to a crucible, preferably a cold crucible, for induction melting radioactive material and glass frit, comprising:
  a receptacle comprising a bottom and a cover, the receptacle delimiting a cavity,
  a smoothing tool as defined above, the grid being configured to be accommodated in the cavity to smooth the glass frit inside the cavity.

The invention also relates to a crucible as defined above, comprising a holding flange attached to the cover, the cover comprising an aperture for introducing materials, in particular the radioactive material, and a clearance mouth for the smoothing tool.

BRIEF DESCRIPTION OF THE DRAWINGS

The present invention will be better understood in reference to the appended drawings.

DETAILED DISCLOSURE OF PARTICULAR EMBODIMENTS

Figure 1:
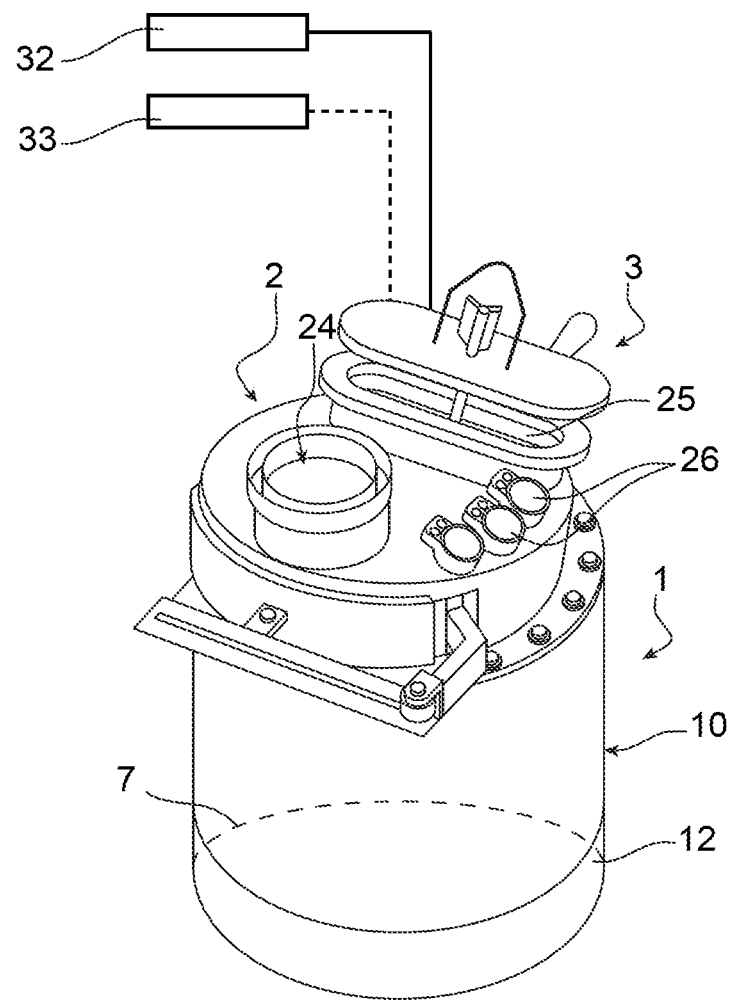
FIG. 1 schematically represents in an elevation view an induction-melting cold crucible for vitrifying radioactive waste which is equipped with a smoothing tool according to one preferred embodiment of the invention.

Identical, similar or equivalent parts of the different figures bear the same reference numerals so as to facilitate switching from one figure to the other.

FIG. 1 represents an induction-melting cold crucible 1 for vitrifying radioactive waste using glass frit 7. The glass frit 7 and radioactive waste, consisting for example of fission products from the treatment of irradiated nuclear fuels, are induction heated in the cold crucible 1.

This cold crucible 1 comprises a receptacle which includes a cylindrical ferrule 10, one or more inductors (not represented) surrounding the ferrule 10, a lower hearth 12 which acts as a bottom for the receptacle, and a dome 2 as a cover for the receptacle. The cold crucible 1 is equipped with a smoothing tool 3 to smooth the glass frit 7 inside the receptacle, before heating it.

The dome 2 is attached to the upper part of the ferrule 10. It includes an aperture 24 for introducing materials, in particular radioactive materials to be vitrified, a mouth 25 used for introducing the smoothing tool and holes 26 for measuring equipment such as a stick for measuring the temperature inside the crucible 1.

Figure 2:
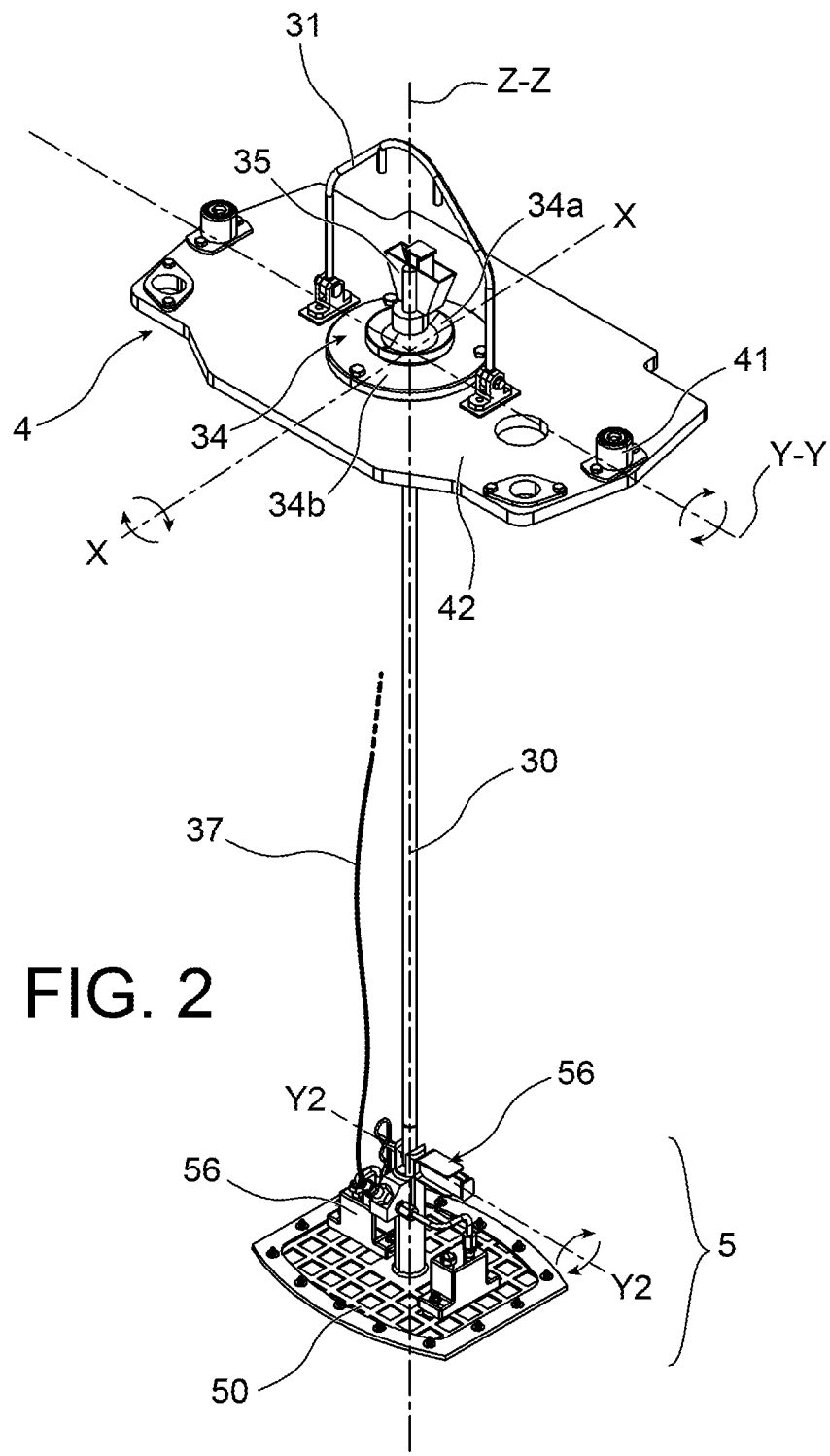
FIG. 2 is a schematic representation in an elevation view of the smoothing tool of the preferred embodiment.

In reference to FIG. 2, the smoothing tool 3 includes a gripping handle 31 and a holding flange 4 to which the gripping handle 31 is attached at its two ends, for example through bolting. This tool also comprises a rod 30 passing through the holding flange 4, as well as a vibrating tray 5 mechanically connected to the rod 30.

The smoothing tool 3 is moved and held in position facing the mouth 25, using a gripping device 32. This gripping device 32 comprises a hook or a rope which cooperates with the gripping handle 31.

The rod 30 includes in its upper part a hood 35. This hood 35 acts as an interface with a telemanipulator clamp (not represented) of a teleoperation device 33 to handle the rod 30. The telemanipulator is configured to move the tray 5 inside the crucible 1 to smooth the glass frit 7 therein.

The holding flange 4 is removably attached by bolts 41 to the dome 2, above the mouth 25 and below the hood 35. The flange 4 has the shape of a substantially rectangular plate 42 located in a plane defined by a first axis X-X and a second axis Y-Y perpendicular to the axis X-X. The rod 30 passes therethrough in its centre part and the flange includes at this one hole to let through a flexible pipe 37 which extends along the rod 30.

In FIG. 2, the longitudinal axis of the rod Z-Z is represented orthogonal to the axis X-X and to the axis Y-Y, but the tilt of the longitudinal axis Z-Z is variable relative to the axes X-X and Y-Y.

The rod 30 is, among other things, connected to the holding flange 4 by a ball-joint connection 34. The ball-joint connection 34 includes an inner flange 34a about the rod 30 and an outer flange 34b surrounding the inner flange 34a. The ball-joint connection 34 enables the rod 30 to be rotated with respect to the holding flange 4 about the axis X-X which makes up a first axis of rotation, about the axis Y-Y which makes up a second axis of rotation and about the longitudinal axis Z-Z which makes up a third axis of rotation.

In addition to pivot about the first axis of rotation X-X and about the second axis of rotation Y-Y, the rod 30 is translationally movable along the longitudinal axis Z-Z relative to the holding flange 4. The rod 30 is thus guided with respect to the flange 4 with four degrees of freedom.

In its lower part which is located under the holding flange 4, the smoothing tool 3 comprises a vibrating tray 5. The vibrating tray 5 is mechanically connected to the rod 30 opposite the gripping handle 31 along the longitudinal axis Z-Z. This tray 5 includes a grid 50 for bearing on the surface of the glass frit 7 and vibrating elements 56 configured to vibrate the grid 50.

Figure 3:
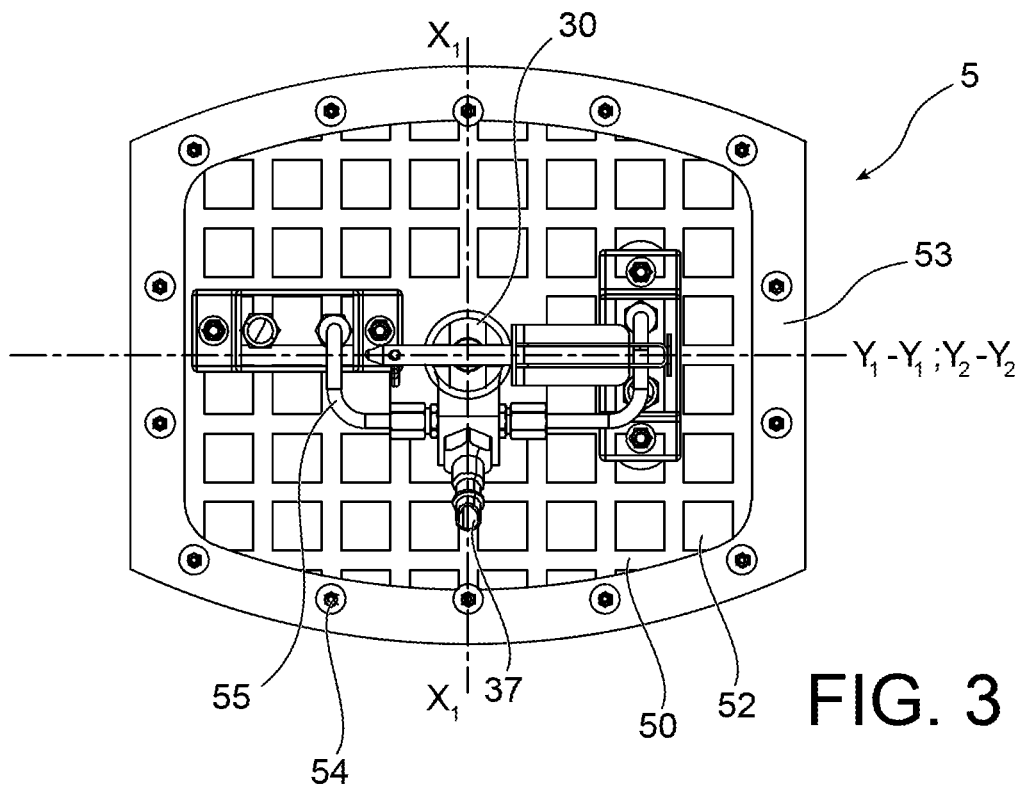
FIG. 3 is a transverse cross-section top view of the rod of the smoothing tool of the preferred embodiment.
Figure 4:
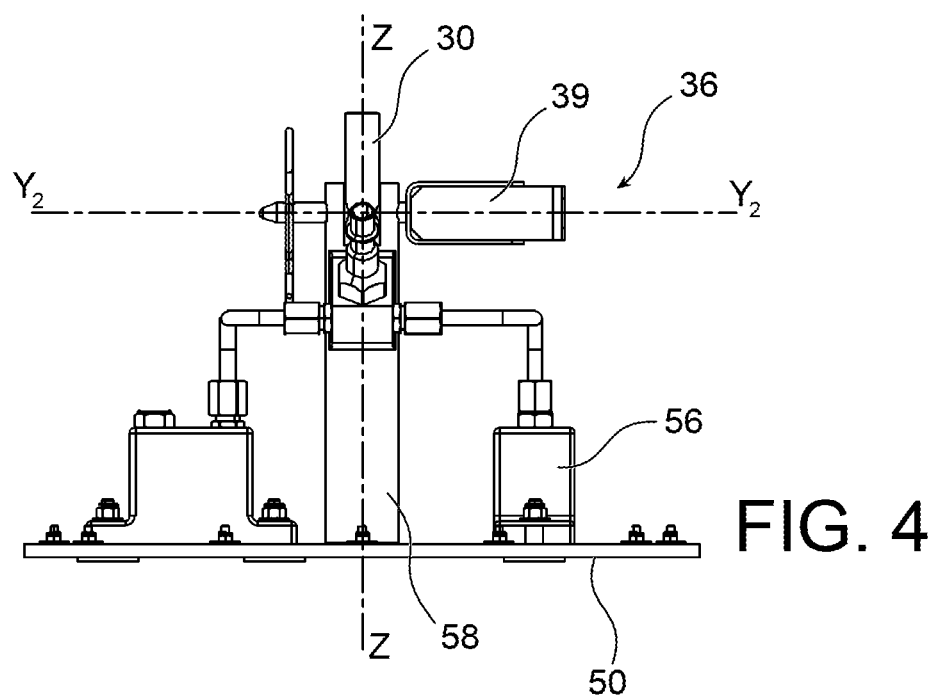
FIG. 4 is a longitudinal cross-section partial schematic representation along the axis of the rod of the smoothing tool of the preferred embodiment.

In reference to FIG. 3, the grid 50 includes square-shaped through holes 52. These holes 52 are distributed in rectilinear rows parallel to each other, in a regular pattern. They are also distributed in rectilinear columns parallel to each other, in a regular pattern. The pattern of the grid is chosen such that the grid 50 does not sink in the glass frit 7, while transmitting mechanical vibrations to the glass frit 7 to smooth it.

The grid 50 has a generally quadrilateral shape with two substantially parallel sides and two curved sides. It is substantially planar. It has two axes of symmetry, in the plane of FIG. 3, X1-X1 and Y1-Y1 which are substantially perpendicular to each other.

The grid 50 is made of a metal material, typically of stainless steel, among other things to achieve a suitable rigidity for the grid 50, to limit the wear thereof in contact with the glass frit 7 and to limit the risk of polluting the glass frit with the material making up the grid 50.

The tray 5 is equipped with a rim 53 located on the entire perimeter of the grid 50 and attached through bolts 54 to the grid 50. This rim 53 is used to mechanically strengthen the grid, in particular when the same is vibrated by the vibrating elements 56.

The vibrating elements 56 are attached through bolting to the grid 50. They are each supplied with compressed air, from outside the cold crucible 1, by a rigid conduit 55, the rigid conduit(s) 55 being connected to the flexible pipe 37.

The conduits 55 each generally have a V-shape and are screwed to the rod 30. The conduits 55 are fluidly connected to each other. They act as an air supply connection between the vibrating elements 56 and the flexible pipe 37.

The flexible pipe 37 extends along the rod 30. It opens directly into one of the conduits 55 and it supplies the other conduit 55 through the conduit 55 it opens into.

The air conduits 55, the flexible pipe 37 and the vibrating elements 56 form a pneumatic vibrator configured to vibrate the grid 50.

In order to mechanically connect the tray 5 to the rod 30, the tray 5 also comprises a connection portion 58 cooperating with a clevis 36. This clevis 36 removably connects the tray 5 to the rod 30.

The clevis 36 comprises a rotating connection pin 39 equipped with a gripping portion. The pin 39 mechanically connects the rod 30 to the female clevis 58. It cooperates with a pull pin which prevents the pin 39 from being removed.

The clevis 36 enables the tray 5 to pivot relative to the rod 30 about an axis of rotation Y2-Y2 which is substantially orthogonal to the longitudinal axis Z-Z. The axis Y2-Y2 is substantially parallel to the axis Y1-Y1. This axis of rotation Y2-Y2 passes through the pin 39 when the tray 5 is mechanically connected to the rod 30.

The both ball-joint connection and translational connection of the rod 30 with respect to the holding flange 4 on the one hand and the pivot connection of the tray 5 relative to the rod 30 on the other hand enable the glass frit 7 to be smoothed in substantially all the directions inside the cold crucible 1 until a suitable flatness of the glass frit 7 is achieved.

In particular, the pivot connection about the axis Y2-Y2 of the tray 5 with respect to the rod 30 enables the tray 5 to be more efficiently adapted to the shape of the pile formed by the glass frit 7 when the same has just been introduced in the cold crucible 1. The grid 50 is in particular able to snugly fit at any time the slope of the heap of glass frit 7 in the cold crucible 1.

The glass frit 7, made of crushed glass, has a granular aspect and generally forms a substantially conical shaped pile in the crucible 1 before being smoothed.

Smoothing the glass frit 7 by the smoothing tool 3 can occur shortly after the crucible 1 is filled with the glass frit 7, following a nature change of the radioactive material to be vitrified or following a maintenance operation.

Once the glass frit 7 has been smoothed until a suitable flatness is achieved, the smoothing tool is removed from the crucible and the glass frit is molten. Then, the radioactive material to be vitrified is introduced in the aperture 24 provided to that end. This radioactive material is mixed with the previously molten glass frit 7, in order to incorporate the radioactive material in the vitreous matrix to form a glass immobilizing the radioactive material after cooling.

Of course, various modifications can be made by those skilled in the art to the invention just described without departing from the scope of the disclosure of the invention.

In particular, the vibrating elements 56 could be supplied with a pressurised gas other than air.

On the other hand, the tray 5 can be connected to the rod 30 by a ball-joint connection connection rather than by a pivot connection about the axis Y2-Y2. In a similar way, the rod 30 is not necessarily movable relative to the holding flange 4 with four degrees of freedom. For example, it can be movable relative to the holding flange 4 only with three degrees of freedom in rotation, by a ball-joint connection connection.

What is claimed is:

1. A smoothing tool configured for smoothing glass frit in a radioactive environment, comprising:
   a rod,
   a grid configured to be in contact with the grass frit to be smoothed, the grid being mechanically connected to the rod, wherein the grid is movably connected to the rod and wherein a pin connects the grid to the rod and defines a pivot axis of the grid, and at least one vibrator configured to vibrate the grid.

2. The smoothing tool according to claim 1, wherein the vibrator is configured to pneumatically vibrate the grid, the vibrator being supplied with pressurised gas.

3. The smoothing tool according to claim 2, wherein the vibrator is supplied with pressurised air as a pressurized gas.

4. The smoothing tool according to claim 2, wherein the vibrator comprises:
   pneumatic vibrating elements attached to the grid and configured to vibrate the grid, and
   a pipe extending along the rod and configured to supply the pneumatic vibrating elements with pressurised gas.

5. The smoothing tool according to claim 1, wherein the pivot axis is orthogonal to the longitudinal axis of the rod.

6. The smoothing tool according to claim 1, wherein the grid includes recesses distributed in a regular pattern.

7. The smoothing tool according to claim 1, comprising a holding flange configured to be attached to a cover for an induction-melting crucible, wherein the rod passes through the holding flange and wherein the rod is movable relative to the holding flange.

8. The smoothing tool according to claim 7, wherein the rod is movable relative to the holding flange at least translationally.

9. The smoothing tool according to claim 7, wherein the rod is configured to pivot with respect to the holding flange about a first axis of rotation.

10. The smoothing tool according to claim 9, wherein the rod is connected at least through a ball-joint connection to the holding flange.

11. The smoothing tool according to claim 7, wherein the holding flange includes a clearance hole for a pressurised gas supply pipe.

12. A crucible for induction-melting radioactive material and glass frit, comprising:
   a receptacle comprising a bottom and a cover, the receptacle delimiting a cavity, a smoothing tool configured for smoothing glass fit in a radioactive environment, comprising:
   a rod,
   a grid configured to be in contact with the grass fit to be smoothed, the grid being mechanically connected to the rod, wherein the grid is movably connected to the rod and
   wherein a pin connects the grid to the rod and defines a pivot axis of the grid, and
   at least one vibrator configured to vibrate the grid,
   wherein the grid is configured to be accommodated in the cavity to smooth the glass frit inside the cavity.

13. The crucible according to claim 12, wherein the crucible is a cold crucible.

14. The crucible according to claim 13, comprising a holding flange attached to the cover, the cover comprising an aperture for introducing radioactive material, and a clearance mouth for the smoothing tool.

15. The crucible according to claim 12, comprising a holding flange attached to the cover, the cover comprising an aperture for introducing materials, and a clearance mouth for the smoothing tool.

16. The crucible according to claim 12, wherein the vibrator is configured to pneumatically vibrate the grid, the vibrator being supplied with pressurised gas.

17. The crucible according to claim 16, wherein the vibrator is supplied with pressurised air as a pressurized gas.

18. The crucible according to claim 16, wherein the vibrator comprises:
   pneumatic vibrating elements attached to the grid and configured to vibrate the grid, and a pipe extending along the rod and configured to supply the pneumatic vibrating elements with pressurised gas.

19. The crucible according to claim 12, wherein the pivot axis is orthogonal to the longitudinal axis of the rod.

20. The crucible according to claim 12, wherein the grid includes recesses distributed in a regular pattern.

21. The crucible according to claim 12, comprising a holding flange configured to be attached to a cover for an induction-melting crucible, wherein the rod passes through the holding flange and wherein the rod is movable relative to the holding flange.

22. The crucible according to claim 21, wherein the rod is movable relative to the holding flange at least translationally.

23. The crucible according to claim 21, wherein the rod is configured to pivot with respect to the holding flange about a first axis of rotation.

24. The crucible according to claim 23, wherein the rod is connected at least through a ball-joint connection to the holding flange.

25. The crucible according to claim 21, wherein the holding flange includes a clearance hole for a pressurised gas supply pipe.

* * * * *

UNITED STATES PATENT AND TRADEMARK OFFICE
CERTIFICATE OF CORRECTION

PATENT NO. : 11,315,698 B2
APPLICATION NO. : 15/579835
DATED : April 26, 2022
INVENTOR(S) : Yohann Cassany It is certified that error appears in the above-identified patent and that said Letters Patent is hereby corrected as shown below:

In the Specification

Column 1, Line 37, "in contact with the grass" should read -- in contact with the glass --.

In the Claims

Claim 1, Column 5, Line 15, "in contact with the grass" should read -- in contact with the glass --.

Claim 12, Column 6, Line 3, "smoothing glass fit in a" should read -- smoothing glass frit in a --.

Claim 12, Column 6, Line 6, "with the grass fit to be" should read -- with the glass frit to be --.

Signed and Sealed this
Twenty-first Day of March, 2023

Katherine Kelly Vidal
*Director of the United States Patent and Trademark Office*